United States Patent
Sarrut et al.

(10) Patent No.: US 8,236,156 B2
(45) Date of Patent: Aug. 7, 2012

(54) MICROFLUIDIC METHOD AND DEVICE FOR TRANSFERRING MASS BETWEEN TWO IMMISCIBLE PHASES

(75) Inventors: Nicolas Sarrut, Seyssinet-Pariset (FR); Hubert Jeanson, Saint Martin d'Uriage (FR)

(73) Assignee: Commissariat A l'Energie Atomique, Paris (FR)

( * ) Notice: Subject to any disclaimer, the term of this patent is extended or adjusted under 35 U.S.C. 154(b) by 1134 days.

(21) Appl. No.: 11/393,909

(22) Filed: Mar. 31, 2006

(65) Prior Publication Data

US 2006/0231398 A1 Oct. 19, 2006

(30) Foreign Application Priority Data

Apr. 19, 2005 (FR) ...................................... 05 03886

(51) Int. Cl.
*B67D 5/00* (2006.01)
(52) U.S. Cl. ....................................................... 204/450
(58) Field of Classification Search ............... 73/863.21, 73/28.04, 28.05, 863.24, 863.41, 864.81, 73/864.71; 204/600, 643, 648, 450; 422/83, 422/88, 89, 94, 50, 68.1, 81, 82, 100; 436/43, 436/47, 52, 53, 63, 174, 180
See application file for complete search history.

(56) References Cited

U.S. PATENT DOCUMENTS

| | | | |
|---|---|---|---|
| 4,215,994 A * | 8/1980 | Kodras | 436/178 |
| 6,008,490 A * | 12/1999 | Kato | 250/282 |
| 6,294,063 B1 * | 9/2001 | Becker et al. | 204/450 |
| 2003/0006140 A1 | 1/2003 | Vacca et al. | |
| 2004/0058450 A1 * | 3/2004 | Pamula et al. | 436/150 |
| 2006/0186048 A1 * | 8/2006 | Tan | 210/656 |

FOREIGN PATENT DOCUMENTS

| | | |
|---|---|---|
| EP | 1 358 931 A2 | 11/2003 |
| JP | 10-274640 | 10/1998 |

(Continued)

OTHER PUBLICATIONS

Burns J.R. and Ramshaw, C., The intensification of rapid reactions in mulitphase systems using slug flow in capillaries, Lab on a Chip, 2001, 1, 10-15.*

(Continued)

*Primary Examiner* — Alex Noguerola
*Assistant Examiner* — Gurpreet Kaur
(74) *Attorney, Agent, or Firm* — Oblon, Spivak, McClelland, Maier & Neustadt, L.L.P.

(57) ABSTRACT

A method of transferring mass of at least one solute between a liquid first phase and a fluid second phase that is immiscible with the first phase, the method comprising moving at least one droplet of said liquid first phase in a microfluidic device by using electric-type forces (electrowetting or dielectrophoresis) within a space that is filled with said fluid second phase. Said droplet is preferably moved by said electric-type forces along a path between a point for injecting said droplet into said microfluidic device, and an extraction and/or analysis zone, said path being defined in such a manner that said droplet sweeps through a significant fraction of said space filled with said fluid second phase. The method may include a step of transferring said droplet using said electric-type forces to a chemical analysis device integrated in said microfluidic device, and a step of chemically analyzing said droplet. The invention also provides a device for implementing such a method.

20 Claims, 3 Drawing Sheets

FOREIGN PATENT DOCUMENTS

| | | | |
|---|---|---|---|
| JP | 2002-526167 | | 8/2002 |
| WO | WO9612541 | * | 5/1996 |
| WO | WO 00/20021 | | 4/2000 |
| WO | WO 03/000418 A2 | | 1/2003 |
| WO | WO 03/045556 A2 | | 6/2003 |

OTHER PUBLICATIONS

He et al., Droplet Charge-to-Mass Ratio Measurement in an EHD Liquid-Liquid Extraction System, 32, 146-154.*

Liu et al., Continous-Flow Microextraction Exceeding 1000-Fold Concentration of Dilute Analytes, Analytical Chemistry, 2000, 72, 4462-4467.*

Washizu, Electrostatic actuation of liquid droplet for microreactor application, IEEE Transaction of Industry Applications, vol. 34, 1998, 732-737.*

Masao Washizu, "Electrostatic Actuation of Liquid Droplets for Microreactor Applications", IEEE Transactions on Industry Applications, IEEE Inc. New York, US, vol. 34, No. 4, XP000848012, ISSN: 0093-9994, Jul./Aug. 1998, pp. 732-737.

* cited by examiner

MICROFLUIDIC METHOD AND DEVICE FOR TRANSFERRING MASS BETWEEN TWO IMMISCIBLE PHASES

The invention relates to a method of transferring mass between two immiscible phases, in particular for liquid-fluid extraction, mainly in analytic applications.

BACKGROUND OF THE INVENTION

Liquid-fluid extraction is a unitary operation commonly used in industrial chemistry and in analytical chemistry, and it consists in causing mass of at least one solute to be transferred between a liquid first phase and a fluid (liquid or gaseous) second phase that is immiscible with the first. It is well known that in order to encourage such transfer, it is necessary to maximize the ratio of the contact area between the phases divided by the volume of the phases. Typically, that is achieved by dispersing one of the phases in the other, e.g. in a beaker and using a magnetic stirrer, followed by the phases separating out by settling.

International patent document WO 96/12540 discloses a method of transferring solute between two non-miscible fluid phases through a plane porous membrane. The transfer of solute from one phase to the other takes place through the pores in the membrane, without which the plane interface between the two fluids would be unstable. The two phases are recovered independently since they are not mixed together at any time.

The article "Analytical chemistry in a drop. Solvent extraction in a microdrop" by H. Liu and P. Dasgupta, published in Analytical Chemistry, Volume 68, page 1817 on Jun. 1, 1996 discloses an analytical application of liquid-liquid extraction at microliter scale. In that article, a droplet of chloroform having a volume of about 1 microliter (µL) is suspended inside a larger drop of a continuously renewed aqueous solution. A solute passes from the aqueous phase to the organic phase and is detected by laser spectrometry. That method requires only very small quantities of solvents and substances for analysis, and it makes it possible to obtain a very high surface/volume ratio. However it is complex to implement since it requires tricky assembly of discrete microfluidic elements.

OBJECTS AND SUMMARY OF THE INVENTION

An object of the present invention is to provide a liquid-fluid extraction method at small scale (microliters), mainly for analytic applications. Advantageously, such a method must enable exchange between the two fluids to be maximized while being simple and rapid. The equipment needed to implement the method must be simple and inexpensive. Such a method can constitute a step in a more complex microfluidic-chemical method: for example it can be applied to purifying small quantities of reagent or to extracting reaction products from a droplet of solvent. Alternatively, when a solute is present in trace quantities in a solution for analysis, the method can be used to concentrate the solute in a solvent, thereby enabling the solute to be detected.

The idea on which the present invention is based is to cause a droplet (having a volume of microliter order, or of the order of hundreds or even tens of nanoliters) of a liquid first phase to travel inside a larger volume (e.g. lying in the range about ten microliters to a few milliliters) of a fluid (liquid or gaseous) second phase by using a microfluidic device of the "fluidic chip" type. The term "microfluidic device" is used therein to mean a device enabling liquid to be manipulated in volumes of less than one milliliter, typically lying in the range a few hundreds of nanoliters to a few hundreds of microliters. Such devices can be mass produced at very low cost by using fabrication techniques that are derived from microelectronics, such as photolithography and thin layer deposition. Another advantage of this technique lies in the fact that a chip type device can include analysis devices integrated therein.

The invention thus provides a method of transferring mass of at least one solute between a liquid first phase and a fluid (liquid or gaseous) second phase that is immiscible with the first phase, the method comprising causing at least one droplet of said liquid first phase to move within a microfluidic device under drive from electric-type forces within a space filled with said fluid second phase. Said droplet may typically have a volume lying in the range 1 nanoliter (nL) to 10 µL, and preferably lying in the range 100 nL to 1 µL.

Preferably, a method of the invention comprises moving said droplet with said electric-type forces along a path between a point for injecting or creating said droplet in said microfluidic device, and an extraction and/or analysis zone, said path being determined in such a manner that said droplet sweeps through a fraction comprising at least 20%, preferably at least 50%, and even more preferably at least 80% of said space filled with said fluid second phase.

Said path may be a pseudo-random path.

Advantageously, said fluid second phase flows inside said space of said microfluidic device with its speed being maintained at a value that is slow enough to enable said droplet of said liquid first phase to be moved using said electric-type forces.

In an embodiment of the invention, said liquid first phase initially contains a solute, and said fluid second phase presents an affinity for said solute that is not less that of said liquid first phase, thereby causing said droplet to become depleted in solute (deconcentrating extraction).

In another embodiment of the invention, said fluid second phase initially contains a solute, and said liquid first phase presents an affinity for said solute that is greater than that of said fluid second phase, thereby causing said droplet to become enriched in solute (concentrating extraction).

In an embodiment of the invention, said droplet of the liquid first phase is caused to move by electrowetting by making use of a difference in conductivity between said liquid first phase and said fluid second phase, said phases being maintained in a space that extends between a bottom plate carrying a matrix of electrodes and a top plate, parallel to said bottom plate, and carrying a counter-electrode facing said matrix of electrodes.

When said liquid first phase presents conductivity that is less than that of said fluid second phase, said droplet is moved from a position corresponding to a starting electrode to a position corresponding to a destination electrode by maintaining said destination electrode at the same potential as said counter-electrode, while a potential difference is established between said counter-electrode and the starting electrode and also the adjacent electrodes.

Conversely, when said liquid first phase presents conductivity that is greater than that of said fluid second phase, said droplet is moved from a position corresponding to starting electrode to a position corresponding to a destination electrode by establishing a potential difference between said destination electrode and said counter-electrode, while said starting electrode and the adjacent electrodes are maintained at the same potential as said counter-electrode.

Said conductivity difference between said liquid first phase and said fluid second phase is typically not less than a factor of 10 and preferably not less than a factor of 100.

In another embodiment, said droplet of said liquid first phase is moved by dielectrophoresis by making use of an electrical permeability difference between said liquid first phase and said fluid second phase. Typically, said difference in electrical permeability between said liquid first phase and said fluid second phase is at least 10%, and preferably at least 50%.

A method of the invention may include a step of using said electric-type forces to transfer said droplet to a chemical analysis device integrated in said microfluidic device, and a step of chemically analyzing said droplet. Said analysis step may include spectrophotometric analysis of said droplet, and/or a step of electronebulizing said droplet in a mass spectrometer.

The invention also provides a device for implementing such a method and comprising:
- a bottom plate having a matrix of electrodes;
- a counter-electrode facing said matrix of electrodes;
- means for injecting or creating droplets of a liquid first phase on the surface of said bottom plate;
- means for injecting on the surface of said bottom plate a fluid second phase in which the droplets of said liquid first phase are immersed; and
- a control device for independently establishing a potential difference between each electrode of said matrix and said counter-electrode so as to define movements of said droplets inside the volume of said fluid second phase.

In particular embodiments:

The device further comprises means for chemically analyzing said droplets.

The device further comprises means for evacuating the fluid second phase so as to establish a flow thereof over the surface of said bottom plate.

The device further comprises a top plate parallel to said bottom plate co-operating therewith to define a space that can be filled with said fluid second phase and carrying said counter-electrode.

Said counter-electrode is constituted by at least one conductor wire immersed or tensioned in at least one of said fluid phases.

Said control device is provided to define movements of said droplets along a path enabling them to sweep through at least 20%, preferably at least 50%, and more preferably at least 80% of the volume of said fluid second phase.

BRIEF DESCRIPTION OF THE DRAWINGS

The invention can be better understood on reading the following description with reference to the accompanying drawings, in which.

MORE DETAILED DESCRIPTION

Figure 1:
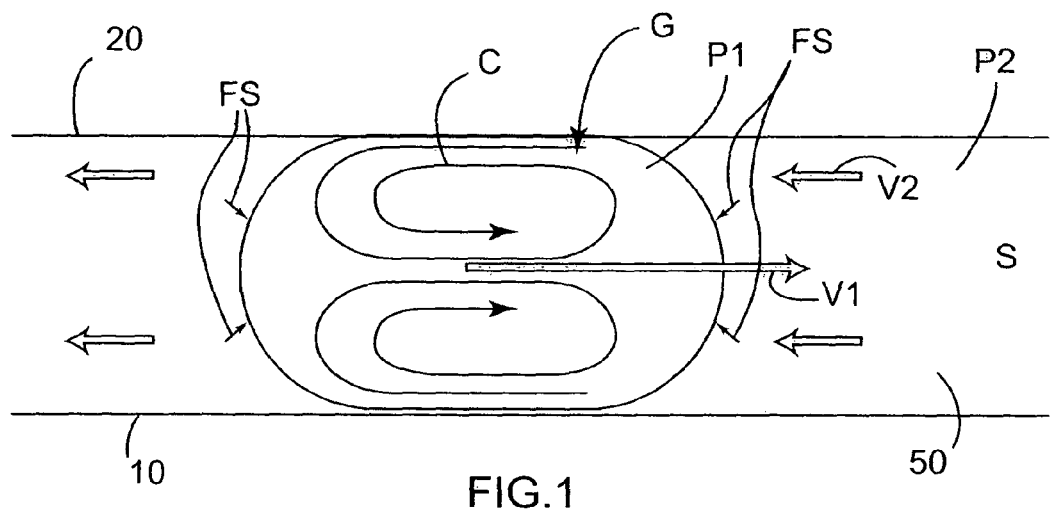
FIG. 1 shows the process whereby mixing and mass transfer take place while implementing a method of the invention.

The principle on which the invention is based can be understood with the help of FIG. 1. A droplet G of a liquid first phase P1 having a volume lying in the range 10 nl to 10 µl, for example, and preferably in the range 100 nl to 1 µl, is placed in a space 50 extending between a bottom plate 10 and a top plate 20, and is immersed in a fluid second phase P2 that is immiscible with the first phase. For example, the first phase P1 may be constituted by an organic solvent such as chloroform or carbon tetrachloride, while the second phase P2 is an aqueous solution. The second phase P2 initially contains a solute S that presents high affinity for the first phase P1. The solute S may be constituted by atoms, ions, simple or complex molecules, cells, or biological entities such as viruses. The solute may also have an affinity for one of the ingredients of the phase P1. A chemical complex or a precipitate incorporating S then forms in the receiving phase P1. The solute S may be also be an antigen for performing an antigen/antibody reaction, e.g. if S is a bacteria. Similarly, a chemical compound may be introduced into the phase P2 to constitute an entity (a complex, a precipitate, . . . ) that is highly soluble in the phase P1 so as to be transferred easily into said phase, where it can reside as such or where it can be transformed again.

As represented by arrows FS, a flow of solute FS takes place through the interface between the two phases, from the phase P2 into the phase P1. If the two phases P1 and P2 remain stationary, mass is transferred solely by the molecular diffusion effect, and equilibrium is reached very slowly, particularly if the volume of the space 50 filled with the second phase P2 is large compared with the droplet G. That is why the method of the invention includes moving said droplet (arrow V1) so that it sweeps through said space 50. Thus, once the solute S has been extracted from a region of the microfluidic device, the droplet G leaves the depleted region and moves towards zones that are richer in solute. In addition, the movement enables the content of the droplet G to be mixed (turbulence C in FIG. 1), thus making its own concentration of solute S uniform and consequently encouraging extraction. Such a homogenizing effect induced by the movement of a droplet is described by J. R. Burns and C. Ramshaw in the article "The intensification of rapid reactions in multiphase systems using slug flow in capillaries", Lab on a chip, 2001, pages 10-15, published on the Internet on Aug. 9, 2001. Nevertheless, that article relates to a situation that is very different, in which the droplet is the seat of a chemical reaction without any mass being transferred to or from the surrounding liquid phase.

Under such conditions, it can be considered that the concentrations $C_1$ and $C_2$ of solute S in the droplet and in the liquid second phase are uniform, with the exception of two diffusion films in which the concentrations vary rapidly. When a steady state is achieved, the concentrations at the interface become respectively equal to $C_2^i$ and $C_1^i = H \cdot C_2^i$, assuming that the interface resistance is zero, and where H is the partition coefficient for the solute S between the first phase and the fluid second phase (H>1 if it is desired to concentrate the solute in the droplet). The speed of solute transfer from the phase P2 to the phase P1 per unit area of contact is given by:

$$v = K(H \cdot C_2 - C_2) = K(H-1)C_2$$

which shows that the maximum concentration of solute in the droplet that can be achieved in theory is equal to $H \cdot C_2$. The overall transfer conductance K can be expressed as follows:

$$K=(H/k_2+1/k_1)^{-1}$$

where $k_i=D_i/e_i$, for i=1,2, where $D_i$ is the molecular diffusion coefficient in phase i (P1, P2), and where $e_i$ is the thickness of the corresponding diffusion film.

Preferably, the fluid second phase P2 flows inside a microfluidic device (arrow V2) so as to be continually renewed. This enables the kinetics of the method to be improved since the phase P2 that has been depleted in solute S is continuously removed. In addition, it is possible in this way to put a large volume of the phase P2 into contact with the droplet G while using a device of small dimensions. The speed V2 of the phase P2 needs to be small enough to avoid entraining the droplet(s) G of the liquid first phase P1. The maximum acceptable speed V2 depends on circumstances and in particular on the relative wetting of the two phases P1 and P2 on their respective surfaces and on the magnitude of electric-type forces used for moving the droplet G. The flow rate of the fluid second phase P2 may lie in the range 10 nanoliters per minute (nL/min) to a few μL/min, for example.

Alternatively, the method of the invention can be used to purify the liquid first phase P1: under such circumstances ("deconcentrating" extraction) the liquid first phase P1 initially contains the solute S and the fluid second phase P2 presents affinity for said solute S that is not less than that of said liquid first phase P1, thereby causing said droplet G to be depleted in solute S.

Figure 2A:
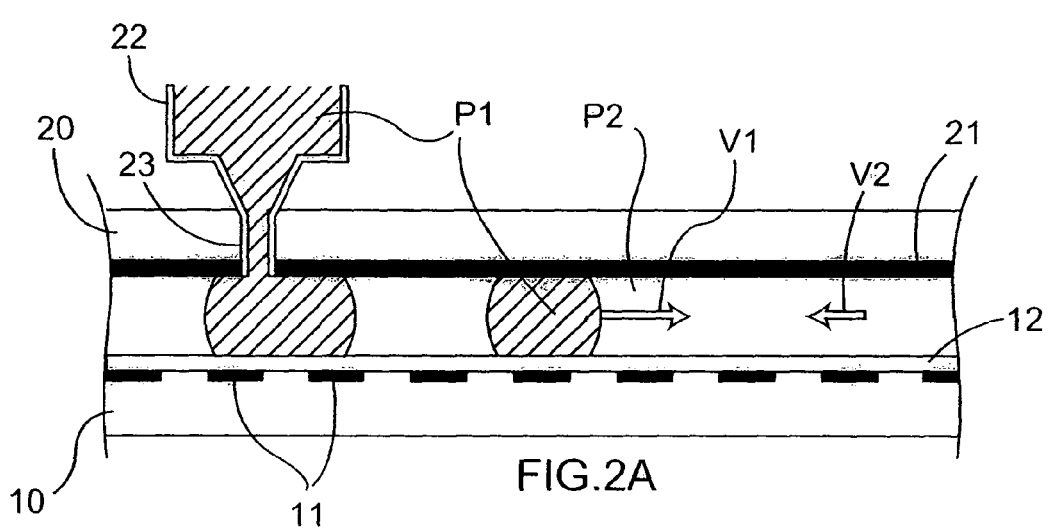
FIGS. 2A and 2B are respectively a side view in section and a plan view of a microfluidic device suitable for implementing the method of the invention.

As shown in FIG. 2A, a device 22 for injecting the liquid first phase P1, such as a needle connected to a supply, passes through an opening 23 formed in the top plate 20 into the space 50 between said top and bottom plates 20 and 10, which space 50 is filled with the fluid (liquid or gaseous) second phase P2. The droplets G may be formed using the electric-type forces as used for providing movement: the potentials of the electrodes 11 and of the counter-electrode 21 are established in such a manner as to produce a stream of liquid that goes away from the needle 22, with said stream then being "strangled" so as to separate into droplets. This technique is described by R. B. Fair, V. Srinivasan, H. Ren, P. Paik, V. K. Pamula, and M. G. Pollak in "Electrowetting-based on-chip sample processing for integrated microfluidics", IEEE International Electron Devices Meeting (IEDM), 2003.

The fluid second phase P2 is kept circulating by an injector device (e.g. a syringe) and a removal device (a duct leading to a receptacle) that are not shown. These devices are connected to the phase 50 via capillaries 24 and 25 having an inside diameter of about 100 micrometers (μm).

The movement of the droplets G of the liquid first phase P1 cannot be induced by a pressure difference since that would lead to both fluid phases moving simultaneously, which is not desired. It has therefore been decided to move said droplets by using electric-type forces, and in particular by using the effect known as electrowetting. This effect is described, for example, in the article "Reversible electrowetting and trapping of charge: model and experiments" by H. J. J. Verheijen and M. V. J. Prins, Langmuir 1999, 15, 6616-6620.

The article "Electrowetting-based actuation of liquid droplets for microfluidic applications" by M. G. Pollack, R. B. Fair, and A. D. Shenderov discloses moving droplets of a conductive liquid in an insulating medium by using electrowetting.

In the context of the present invention, it is made possible to drive the droplets electrically by means of a grid of electrodes 11 that are disposed on the top surface of the bottom plate 10 and a counter-electrode 21 disposed on the bottom surface of the top plate 20.

In a variant, the counter-electrode 21 could be replaced by conductor wires immersed or tensioned in at least one of the two fluid phases. Wires tensioned parallel to the bottom plate 10 and performing the functions of a counter-electrode and a droplet guide are known as "microcatenaries"; this technology is described in the article by Y. Fouillet, H. Jeanson, D. Dary, O. Constantin, and C. Vauchier "Moving droplets with microcatenaries", 7th International Conference on Miniaturized Chemical and Biochemical Analysis System", Oct. 5-9, 2003, Squaw Valley, Calif., United States of America.

In the device of FIG. 2A, the electrodes 11 are separated from the fluid phases P1 and P2 by an insulating coating 12 while the counter-electrode 21 is in electrical contact therewith. In a variant, the counter-electrode 21 could also carry an insulating coating. The electrodes 11 and the counter-electrode 21 are connected via individual electrical connections to a control device that makes it possible to establish independent potential differences between each electrode 11 and the corresponding counter-electrode. Establishing this potential difference makes it possible to actuate the droplets G which can be caused to follow an accurately-determined path, as demonstrated below. In order to clarify the figures, said electrical connections are omitted.

Figure 2B:
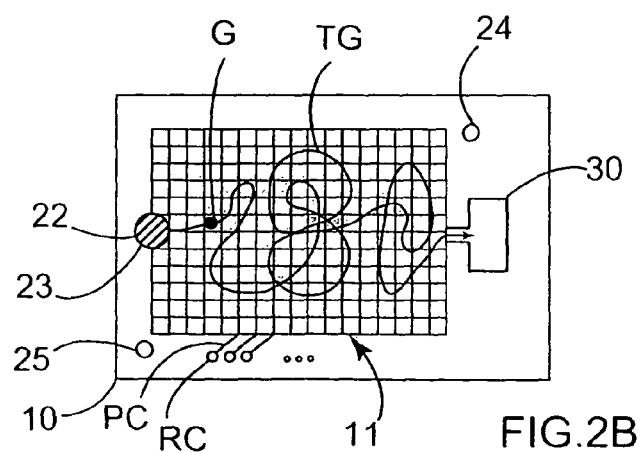

The plan view of FIG. 2B, seen looking through the top plate 20 assuming it to be transparent, show that the grid of electrodes 11 connects the injection device 22 to an extraction and/or droplet analysis zone 30. At the periphery of the array of electrodes 11, three contact pads RC are shown. In reality, there are as many contact pads RC as there are electrodes in the array 11, and each of them is connected to a corresponding electrode via a conductor track PC. For reasons of simplification, the electrodes of the array 11 are shown in the figure as being square, but in reality it is advantageous for them to present an outline having protuberances so that they are interleaved in one another; it is known that that makes it easier to move droplets G.

The line TG shows an example of the path of a droplet G from the injection device 22 to said extraction and/or analysis zone 30. The path TG is two-dimensional and pseudo-random, and it allows the droplet G to sweep through a large fraction of the volume of the space 50 filled with the fluid second phase P2; in this way, it can become filled effectively with solute S while avoiding the excessively long times required for molecular diffusion. In this context, a "large fraction" means a fraction comprising at least 20%, and preferably at least 50%, and even more preferably a fraction comprising about 80% or more.

Instead of being pseudo-random, the path TG could also be regular in nature: the important point is that it should enable the droplet G to sweep effectively through a large fraction of the space 50 filled with the fluid second phase P2.

Figure 3A:
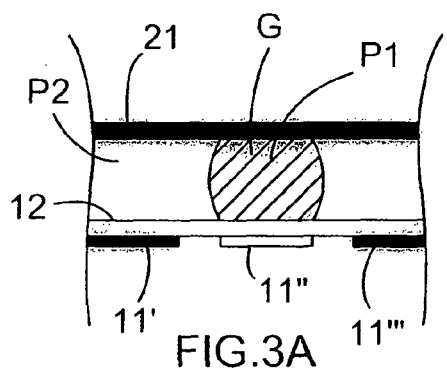
FIGS. 3A and 3B show one step of a method of moving a droplet of conductive liquid by electrowetting in a medium constituted by a non-conductive fluid, in an implementation of the present invention.
Figure 3B:
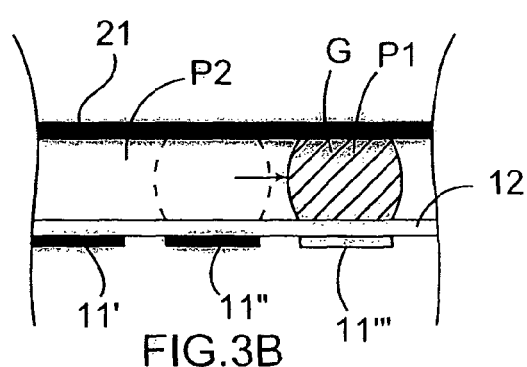

FIGS. 3A and 3B show a single step of moving a droplet G of a liquid first phase P1 that is conducive and immersed in a fluid second phase P2 that is substantially non-conductive, i.e. presenting conductivity that is at least ten times and preferably 100 times smaller than that of said liquid first phase P1. Initially, as shown in FIG. 3A, the droplet G is positioned in correspondence with an electrode 11" that is maintained at an electrical potential that is different from that of the counter-electrode 21, while the adjacent electrodes 11', 11''' are maintained at the same potential as the counter-electrode. In this figure, and in the next figure, the electrode(s) that are "active", i.e. that present a potential difference relative to the counter-electrode 21, are shown in white, while the electrodes having the same potential as the counter-electrode are shown in black. It can easily be understood on the basis of the laws of electrostatics, that the droplet G is in a situation of stable equilibrium. If it is desired to move said droplet towards the electrode 11''', it suffices to apply a potential difference between the electrode 11''' and the counter-electrode 21, while the starting electrode 11'' is brought to the same potential as said counter-electrode 21. The potential differences in question typically lie in the range 10 volts (V) to a few hundreds of volts. Under such conditions, the droplets can achieve travel speeds of the order of a few centimeters per second.

This method makes use of the phenomenon known under the name "electrowetting", which requires a significant difference in conductivity between the two phases P1 and P2. The same effect is obtained by dielectrophoresis when said phases are both substantially insulating, and the liquid first phase P1 presents electrical polarizability that is perceptibly greater than that of the fluid second phase P2 (e.g. at least 10% greater and preferably at least 50% greater). Moving droplets by dielectrophoresis is described, for example, in the article by J. Vykoukal, J. A. Schwartz, F. F. Becker, an P. R. C. Grascoyne, entitled "A programmable dielectrophoretic fluid processor for droplet-based chemistry", Micro Total Analysis Systems 2001, pages 72-74, Kluwer Academic Publishing.

Figure 4A:
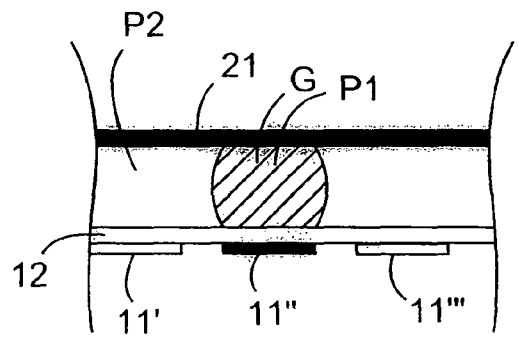
FIGS. 4A and 4B show one step of a method of moving a droplet of non-conductive liquid by electrowetting in a medium constituted by a conductive fluid, in an implementation of the present invention.
Figure 4B:
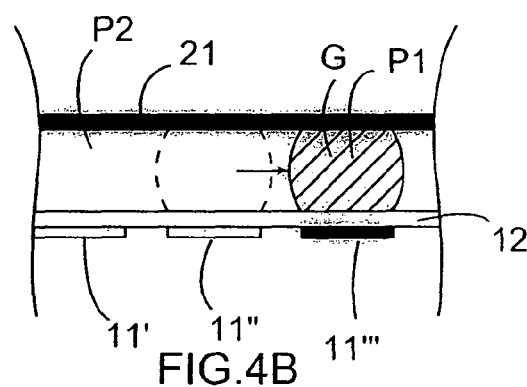

When it is the fluid second phase P2 that is electrically conductive, while the liquid first phase is substantially non-conductive, it is possible to proceed as shown in FIGS. 4A and 4B. Initially the droplet G is positioned in correspondence with an electrode 11'' which is maintained at the same electrical potential as the counter-electrode 21, while the adjacent electrodes 11' and 11''' present a potential difference relative thereto. As in the preceding case, the droplet G is in a situation of stable equilibrium. If it is desired to move said droplet towards the electrode 11''', it suffices to bring said electrode to the same potential as the counter-electrode 21, while a potential difference is established between said counter-electrode 21 and the starting electrode 11''.

The same effect is obtained by dielectrophoresis when both of said phases are substantially insulating, and the fluid second phase P2 presents electrical polarizability that is significantly greater than that of the liquid first phase P1 (e.g. at least 10% greater, and preferably at least 50% greater).

In the examples shown in FIGS. 3A to 4B, the counter-electrode 21 is in electrical contact with the phases P1 and P2, while the electrodes of the grid 11 are separated therefrom by an insulating layer 12 that is preferably constituted by a material that is not wettable by the liquid first phase P1, and presenting a dielectric constant that is high, such as $SiO_2$ or PTFE, for example.

The person skilled in the art will understand that similar results can also be obtained by using a counter-electrode that is likewise insulated.

The use of constant potential differences (DC) has been considered, but the person skilled in the art will understand that applying alternating signals (AC), e.g. sinusoidal signals, to the electrodes 11', 11'', and 11''' can enable the same results to be achieved. Typically, the frequencies used are of a few tens of hertz (Hz) to a few kilohertz (kHz) when using electrowetting, and 100 kHz to 10 megahertz (MHz) when using dielectrophoresis.

A method of the invention for transferring mass can advantageously be applied to very small-scale chemical analyses. Under such circumstances, the fluid second phase P2 may be constituted by an aqueous solution that might contain chemical or nuclear pollutants, while the liquid first phase P1 consists in an organic solvent presenting great affinity for said pollutants. The droplets G can become filled with said pollutants in such a manner as to make them easy to detect. For example, it is possible for the phase P1 to be constituted by drops of chloroform having a volume of about 1 μL (where the conductivity of chloroform: $\sigma_{ch}=0.4\times10^{-11}$ millisiemens per centimeter ($mS\cdot cm^{-1}$)), and with the phase P2 being a bath of tap water having a volume of 100 μL to a few mL and containing in solution metallic cations $Pb^{2+}$ at a concentration lying in the range 10 micrograms per liter (mg/L) to 100 mg/L (conductivity: $0.3<\sigma_{H2O}<1$ $mS\cdot cm^{-1}$). The microdrops of chloroform can be moved through the bath by electrowetting by using a potential difference of about 100 V at a frequency of 3 kHz. Instead of a counter-electrode 21, the potential difference may advantageously be applied by using a conductor wire immersed in the fluid, thus implementing an "open topped" bath. The $Pb^{2+}$ ions concentrated in the chloroform microdrops can be detected by spectrophotometry or by colorimetry using dithizone (Dzz) soluble in chloroform, using the reaction $2\ Dzz+Pb\rightarrow Pb(Dzz)_2$.

It is also possible to inject droplets G of different solvents in succession into the device, the solvents presenting different affinities with solutes that may be present in the phase P2. Consequently, it is particularly advantageous for chemical analysis means to be integrated in the microfluidic device used for implementing the mass transfer method.

Figure 5A:
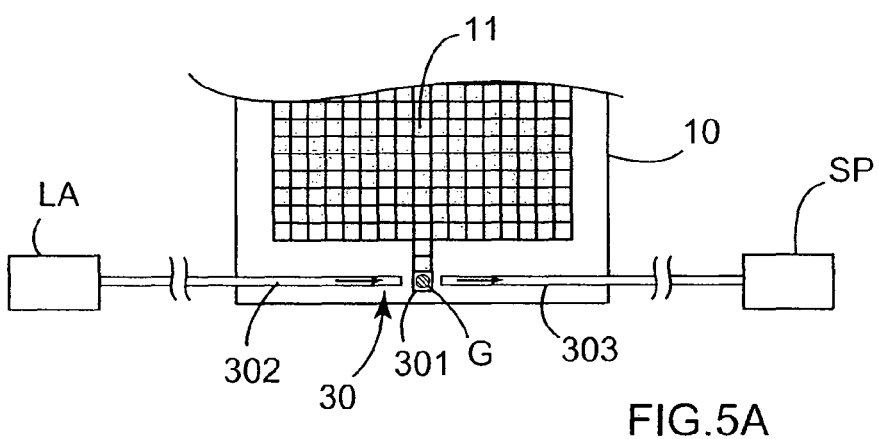
FIGS. 5A and 5B are plan views of two microfluidic devices suitable for implementing two particular implementations of the method of the invention.

By way of example, FIG. 5A is a fragmentary view of a device of the same type as that shown in FIG. 2B, in which the analysis zone 30 includes a portion 31 for positioning a droplet G and first and second optical fibers 302 and 303 that are in mutual alignment and that present ends facing said positioning portion 301 on opposite sides. The first optical fiber 302 is for connection to a source of light radiation, e.g. a laser LA, for illuminating a droplet G brought onto the positioning portion 301 using the electrical method described above with reference to FIGS. 3A to 4B. The second optical fiber 302 is for connection to a spectrophotometer SP in order to pick up and analyze the light radiation that has passed through said droplet G and/or any fluorescent radiation emitted by said droplet. This makes it possible to analyze the solute contained in said droplet G by using spectrophotometric methods. Optionally, the optical fibers 302 and 303 can be replaced by planar dielectric waveguides.

Figure 5B:
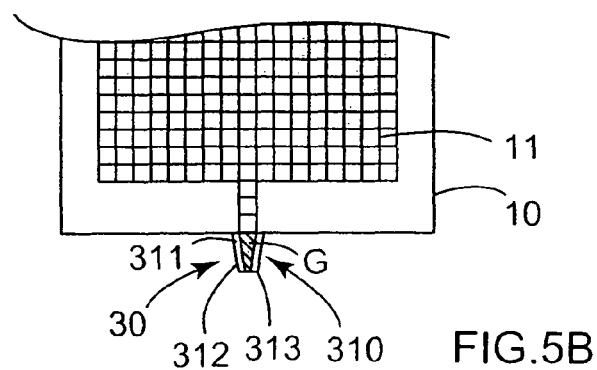

Alternatively, and as shown in FIG. 5B, the zone 30 may be constituted by an electronebulization nozzle 310 constituted by a spout projecting from the edge of the plates 10 and 20 and having a slot 311 defined by two electrodes 312 and 313, that are preferably of elongate and converging shape. Once a droplet G has been brought to the nozzle 310 it is transformed into a liquid stream that fills the slot 311. By applying a potential difference of about 2 kilovolts (kV) between the electrodes 312, 313 and an external counter-electrode, it is possible to nebulize said liquid stream in the form of a gas of ions or a cloud of electrically-charged droplets. If the nozzle 310 is disposed at the inlet of a mass spectrometer, it is possible to perform analysis by mass spectrometry on the liquid first phase P1 and the solute S contained therein.

It is also possible to combine a plurality of analysis devices on a single "chip": for example, it is possible to devise a device in which a droplet G is initially brought to a zone for analysis by spectrophotometry in order subsequently to be electronebulized in a mass spectrometer.

Figure 6:
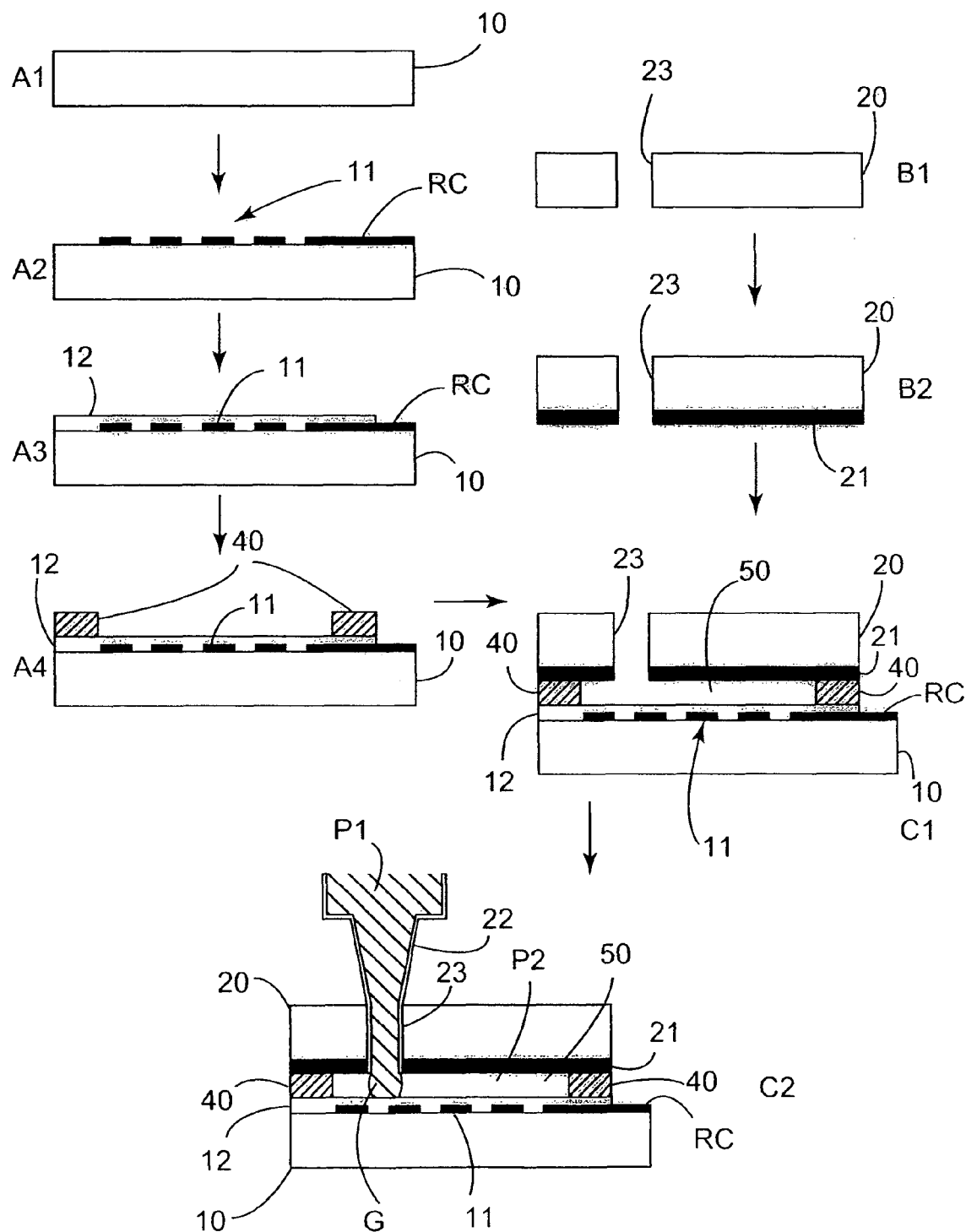
FIG. 6 is a diagram showing the method of fabricating the microfluidic device of FIGS. 2A and 2B.

FIG. 6 is a diagram showing a method of fabricating a device for implementing a method of the invention. Steps A1-A4 relate to making the bottom plate 10, steps B1-B2 to making the top plate 20, and steps C1-C2 to assembling them together. The fabrication method makes use of techniques derived from microelectronics and commonly used in the field of microfluidics.

In order to make the bottom plate 10, the starting material is a substrate typically made of "Pyrex" glass or of silicon oxidized over a thickness of about 500 µm (A1) on which an array 11 of electrodes is made by photolithography, preferably gold electrodes (A2) and using a titanium bonding layer. The conductor tracks PC (not shown) are made simultaneously that connect each electrode to one of the contact pads RC disposed in the peripheral portion of the plate 10. In step A3, an insulating layer 12 is deposited on said electrodes: for example, said layer 12 may be constituted by $SiO_2$ and may be deposited using the technique known as plasma enhanced chemical vapor deposition (PECVD). A photolitographic step serves to separate the contact pads for enabling external circuits to be put into electrical connection with the microfluidic device. Thereafter (A4) thick walls 40 of resin (e.g. SU-8) having a height and thickness of about 50 µm-300 µm are made around the array of electrodes 11 so as to define the space 50 that is to contain the liquid second phase P2; the volume of this space is about 10 µL to 100 µL. The walls 40 are not shown in FIGS. 2B, 5A, and 5B in order to avoid overloading them. The top plate 20 is made from a substrate of "Pyrex" glass or of plastics material (e.g. polycarbonate) having an opening 23 formed therein to allow an injector device 22 to be inserted for injecting the liquid first phase P1 (step B1); thereafter (step B2) a counter-electrode 21 is made by photolithography. Said counter-electrode is preferably made of indium tin oxide (ITO) that presents the advantage of being transparent, thus making it possible to observe the method of the invention taking place. It is optionally possible to place an insulating layer on the counter-electrode, as was done for the bottom plate 10. The two plates are assembled together (step C1) by silkscreening adhesive onto said thick resin walls. Silkscreening adhesive is a technique that makes it possible to spread a layer of adhesive that is very thin (1 µm-10 µm) and that is uniform. A suitable adhesive is Delo-Katiobond 45952 from the supplier Supratec. Silkscreening adhesive is described for example in patent document WO 00/77509. Thereafter, in a step C2, a device 22 for injecting the liquid first phase P1 is inserted into the opening formed in the top plate 20, and the capillaries 23 and 24 (not shown) that open out into the space 50 and that serve to feed and remove the liquid second phase P2 are also installed.

After or before assembly, the inside surfaces of the device, or at least some of them, can be treated by depositing a material that is not wetted by at least the liquid first phase P1 so as to encourage movement of the droplet G. By way of example, this material may be hydrophobic silane that is deposited as a vapor, or Teflon that is deposited as a liquid.

The complete device presents a total area of a few square centimeters and a thickness of a few millimeters. It may be supported by a printed circuit having conductor tracks that can be electrically connected to the contact pads RC using gold wires (the "wire bonding" technique). Alternatively, electrical connection may be provided via test points of dimensions of the order of a few hundreds of micrometers and mounted on springs. Such test points are available from the supplier FM Contact Technologies under the name "Feinmetall test points". In turn, the support circuit can be plugged into a more complex circuit having coaxial feed cables inserted therein. The droplets G can be moved under the control of specially provided software, e.g. using the "Labview" language from the supplier National Instruments.

What is claimed is:

1. A method of transferring the mass of at least one solute between a liquid first phase and a liquid second phase that is immiscible with the first phase, the method comprising:
   causing at least one droplet of said liquid first phase to move within a microfluidic device under drive from electric forces within a space filled with said liquid second phase,
   wherein said droplet is moved with said electric forces along a two-dimensional path between a point for injecting or creating said droplet in said microfluidic device, and an extraction and/or analysis zone, said path being determined in such a manner that said droplet sweeps through a fraction comprising at least 20% of said space filled with said liquid second phase.

2. A method according to claim 1, wherein said droplet sweeps through a fraction comprising at least 50% of said space filled with said liquid second phase.

3. A method according to claim 2, wherein said path is a pseudo-random path.

4. A method according to claim 1, wherein said liquid second phase flows inside said space of said microfluidic device with a speed that is maintained at a value that is slow enough to enable said droplet of said liquid first phase to be moved using said electric forces.

5. A method according to claim 1, wherein said liquid first phase initially contains a solute, and said liquid second phase presents an affinity for said solute that is not less that of said liquid first phase, thereby causing said droplet to become depleted in solute.

6. A method according to claim 1, wherein said liquid second phase initially contains a solute, and said liquid first phase presents an affinity for said solute that is greater than that of said liquid second phase, thereby causing said droplet to become enriched in solute.

7. A method according to claim 1, wherein said droplet of said liquid first phase is moved by electrowetting making use of a conductivity difference between said liquid first phase and said liquid second phase, said phases being maintained in contact with a matrix of electrodes and with a counter-electrode between which potential differences can be established.

8. A method according to claim 7, wherein said liquid first phase presents conductivity less than that of fluid liquid second phase and in which said droplet is moved from a position corresponding to a starting electrode to a position corresponding to a destination electrode by maintaining said destination electrode at the same potential as said counter-electrode while a potential difference is established between said counter-electrode and the starting electrode and also the adjacent electrodes.

9. A method according to claim 7, wherein said liquid first phase presents conductivity greater than that of said liquid second phase and in which said droplet is moved from a position corresponding to starting electrode to a position corresponding to a destination electrode by establishing a potential difference between said destination electrode and said counter-electrode, while said starting electrode and the adjacent electrodes are maintained at the same potential as said counter-electrode.

10. A method according to claim 8, wherein said conductivity difference between said liquid first phase and said liquid second phase is not less than a factor of 10 and preferably not less than a factor of 100.

11. A method according to claim 1, wherein said droplet of said liquid first phase is moved by dielectrophoresis by making use of a difference in electrical permittivity between said liquid first phase and said liquid second phase, said phases being maintained in contact with a matrix of electrodes and with a counter-electrode between which potential differences can be established.

12. A method according to claim 11, wherein said difference in electrical permittivity between said liquid first phase and said liquid second phase is not less than 10%.

13. A method according to claim 1, further comprising:

transferring said droplet using said electric forces to a chemical analysis device integrated in said microfluidic device, and chemically analyzing said droplet.

14. A method according to claim 13, wherein said analysis step comprises spectrophotometric analysis of said droplet.

15. A method according to claim 13, wherein said analysis step comprises a step of electronebulizing said droplet in a mass spectrometer.

16. A method according to claim 1, wherein said droplet of said liquid first phase has a volume lying in the range 10 nL to 10 μL, and preferably in the range 100 nL to 1 μL.

17. A method according to claim 2, wherein said second phase initially contains a solute, and said first phase presents an affinity for said solute that is greater than that of said second phase, thereby causing said droplet to become enriched in solute; and wherein said fraction of the space filled with said second phase swept by said droplet has a volume which is significantly larger than that of said droplet itself, thereby causing said solute to be concentrated inside said droplet.

18. A method according to claim 2, wherein said liquid first phase initially contains a solute, and said second phase presents an affinity for said solute that is not less than that of said first phase, thereby causing said droplet to become depleted in solute; and wherein said fraction of the space filled with said second phase swept by said droplet has a volume which is significantly larger than that of said droplet itself, thereby causing said liquid first phase to be purified.

19. A method according to claim 2, wherein said droplet sweeps through a fraction comprising at least 80% of said space filled with said liquid second phase.

20. A method according to claim 12, wherein said difference in electrical permittivity between said liquid first phase and said liquid second phase is not less than 50%.

* * * * *